United States Patent [19]
Fergason

[11] Patent Number: 6,151,086
[45] Date of Patent: Nov. 21, 2000

[54] METHOD AND APPARATUS FOR CONTROLLABLY SCATTERING LIGHT USING BIREFRINGENT LIQUID CRYSTAL

[75] Inventor: James L. Fergason, Atherton, Calif.

[73] Assignee: Lambent LLC, Pepper Pike, Ohio

[21] Appl. No.: 09/395,143

[22] Filed: Sep. 14, 1999

Related U.S. Application Data

[63] Continuation of application No. PCT/US98/04647, Mar. 9, 1998.

[60] Provisional application No. 60/040,764, Mar. 14, 1997.

[51] Int. Cl.[7] .................. G02F 1/1335; G02F 1/1333; C09K 19/02
[52] U.S. Cl. .................. 349/5; 349/10; 349/86; 349/181
[58] Field of Search .................. 349/5, 10, 86, 349/181, 75

*Primary Examiner*—William L. Sikes
*Assistant Examiner*—Tarifur R. Chowdhury
*Attorney, Agent, or Firm*—Renner, Otto, Boisselle & Sklar, LLP

[57] ABSTRACT

An optical system and projector includes a source of light, an output system having a collection angle for receiving light and passing such received light as an output, and a liquid crystal device including relatively low birefringence liquid crystal material for selectively scattering light through a controlled angle such that a major portion of the scattered light may be collected by said output system, or for transmitting light, the output system including an aperture for transmitting such scattered light and blocking unscattered light. A method of optimizing the angle of scattering of output light in a liquid crystal device which is operable to transmit light or to scatter light to match the entrance pupil of an optical system in order to maximize the amount of collected scattered light, includes selecting the birefringence of the liquid crystal material of about 0.16 or less, and placing the liquid crystal material and medium in physical relation to cause such light scattering or transmission.

22 Claims, 9 Drawing Sheets

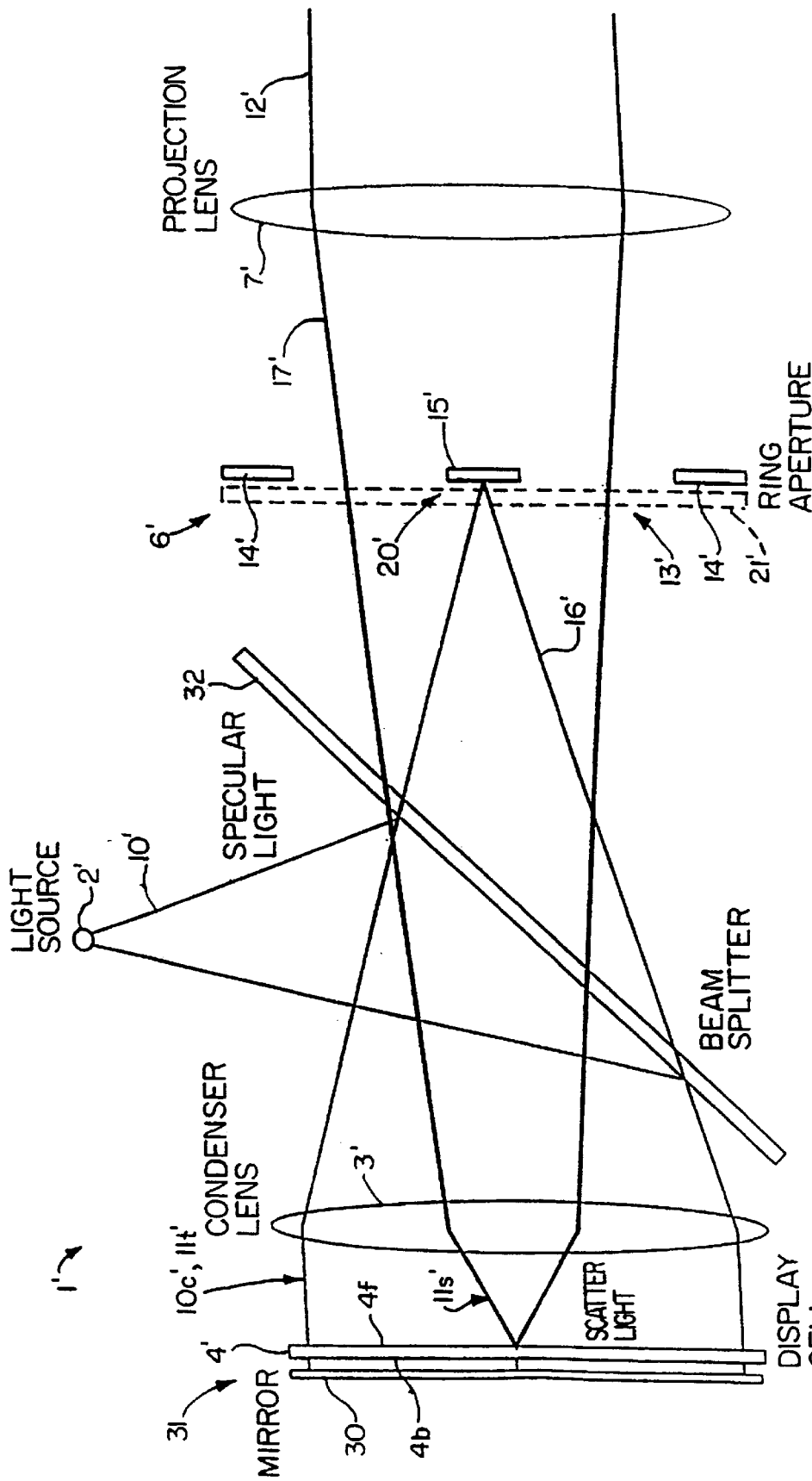

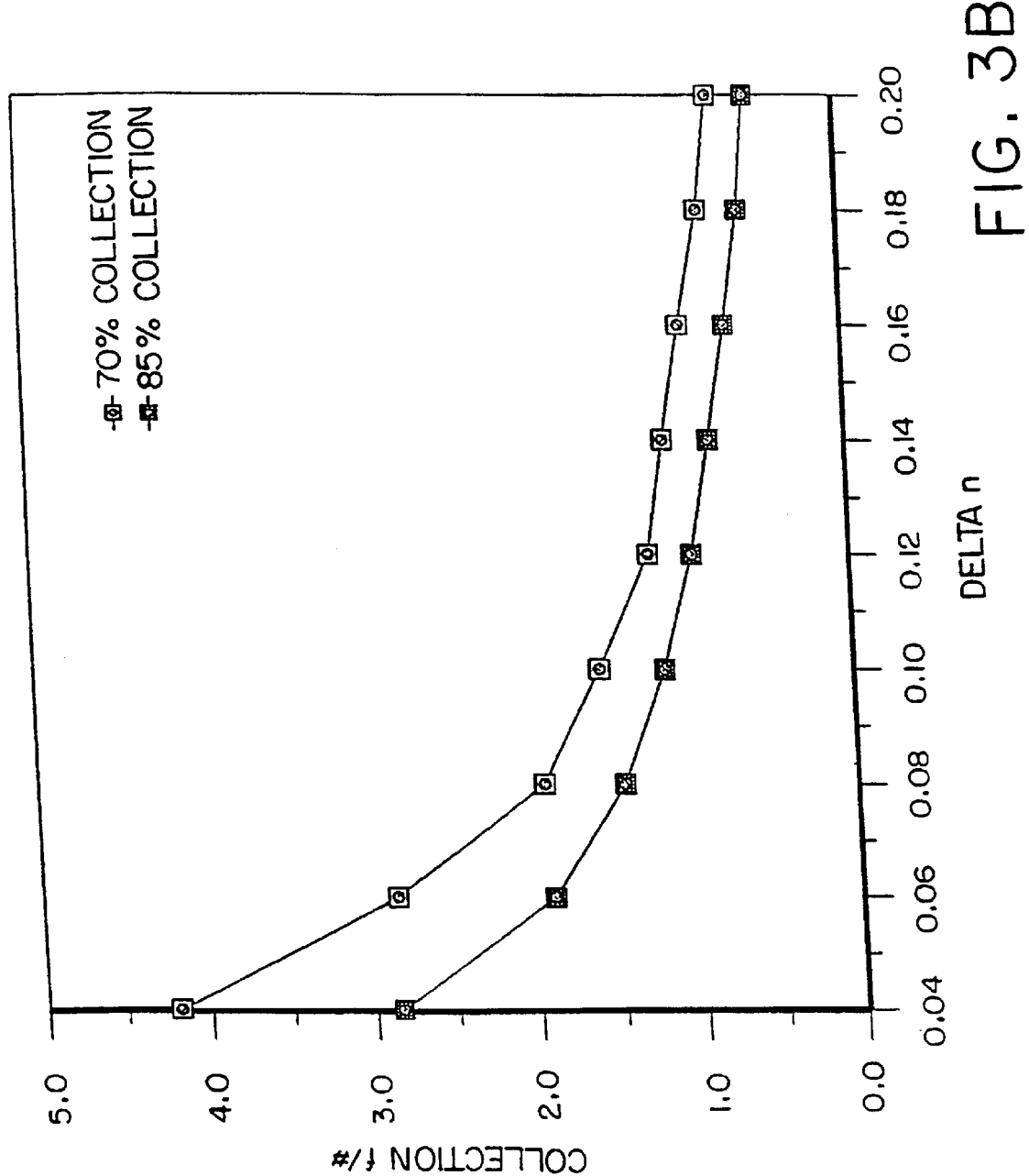

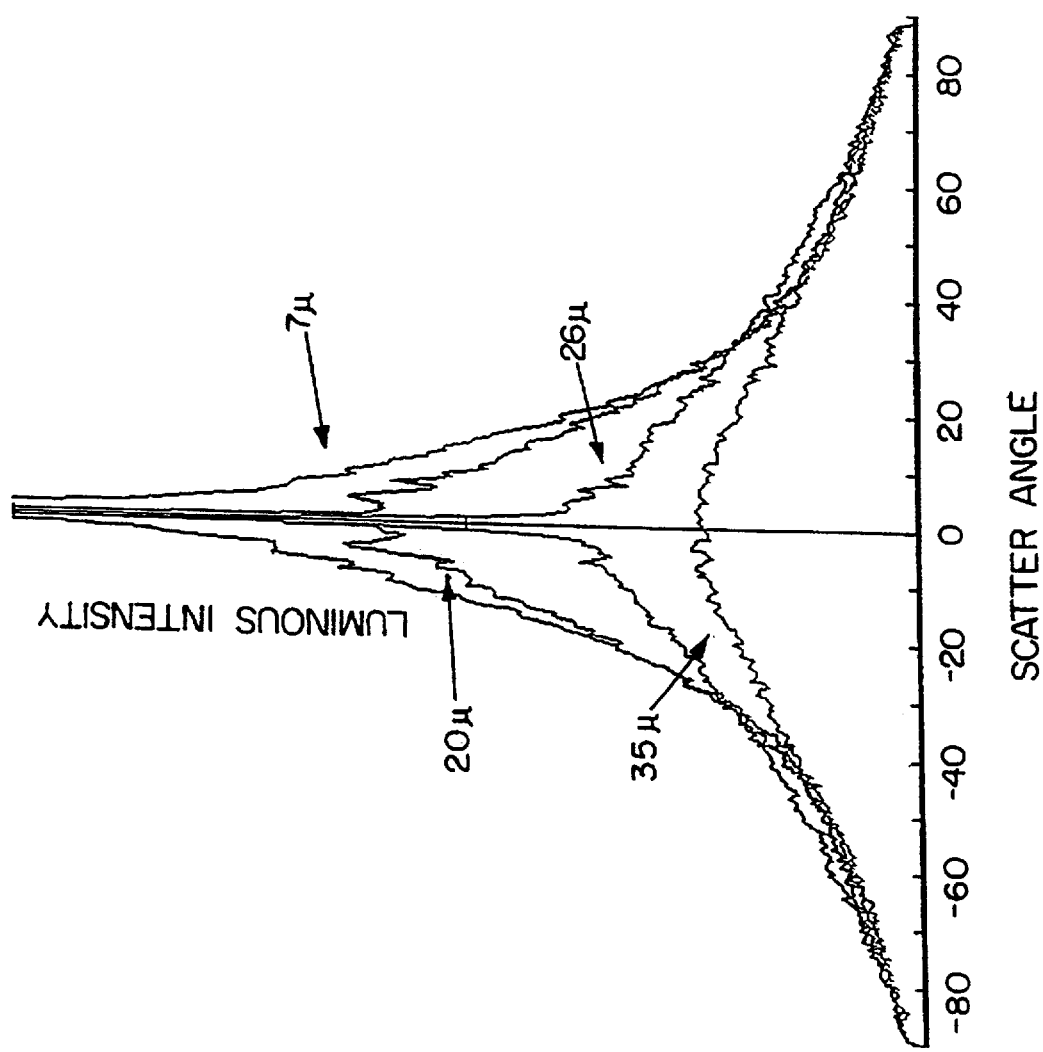

METHOD AND APPARATUS FOR CONTROLLABLY SCATTERING LIGHT USING BIREFRINGENT LIQUID CRYSTAL

This is a continuation of PCT/US98/04647, filed Mar. 9, 1998, claiming priority from 60/040,764, filed Mar. 14, 1997, the entire disclosures of which are incorporated by reference.

TECHNICAL FIELD

This invention relates, generally, as is indicated, to projectors and, more particularly, to the improving of contrast ratio in a projector.

BACKGROUND

Projectors are used for business, for diagnostic purposes, for entertainment and for other purposes to project images from an image source onto a screen or the like for viewing. Many different types of projectors are known, some examples being, slide projectors, movie projectors, overhead projectors, and so forth. In some projectors an image which is fixed on a film, slide, or the like, is projected onto a viewing screen. In another type of projector an image is developed in a medium, such as a liquid crystal device, and the image is projected onto a viewing screen; sometimes these are referred to as liquid crystal projectors.

One example of liquid crystal projector uses a twisted nematic liquid crystal cell to modulate light from a light source to produce an image for projection. In such a projector polarized light is selectively transmitted or blocked by the cooperative relation between a twisted nematic liquid crystal cell and an optical polarizer. A disadvantage to such a projector is the lost efficiency due to the light blocking effect of a polarizer used to obtain polarized light. For example, a polarizer ordinarily blocks about 50% or more of the unpolarized incident light and, therefore, the maximum efficiency of transmission of light to bright areas of a projected image would be limited to 50% or less of the incident light intensity/brightness.

Another example of liquid crystal projector uses the principle of selective scattering or transmitting of light by a liquid crystal device in cooperation with an optical aperture and stop to provide an image for projection. In such a projector the liquid crystal device sometimes is referred to as NCAP, PDLC, LCPC and possibly other names. One example of such a projector is disclosed in U.S. Pat. No. 4,613,207. Several examples of liquid crystal materials or devices useful in such a projector are disclosed in U.S. Pat. Nos. 4,435,047, 4,688,900, and 4,606,611. For brevity, such materials and devices which are operable to scatter or to transmit light collectively may be referred to below as NCAP materials or NCAP devices. Also, for brevity, such other type of liquid crystal projector collectively may be referred to below as an NCAP based LCD projector ("LCD" being a conventional shorthand for liquid crystal display or liquid crystal device) or more simply as NCAP projector.

NCAP based LCD projectors which use the switchable light scattering properties of NCAP to modulate light have been demonstrated for example, as is disclosed in U.S. Pat. No. 4,613,207. In these projectors the light source is focused onto a small aperture located in a plate or mask between the projection lens and the NCAP display device. An image of the projector lamp filament (or arc, if applicable) is formed at the plane of this aperture. The aperture may be just slightly larger in diameter than the image of the lamp filament. When the NCAP device is in a clear (non-scattering) state, substantially all of the light passes through the aperture and is captured by the projection lens. Such transmitted light sometimes is referred to as specular light or specularly transmitted light. Light scattered by the NCAP device (sometimes referred to as scattered light) is redirected away from the aperture and is blocked or stopped by the plate in which the aperture is located. In such a projector system some of the scattered light may also impinge on and pass through the aperture; this light leakage can reduce contrast of the output. It would be desirable to improve contrast.

An alternative embodiment of the NCAP projector disclosed in the above '207 patent uses Schlieren optics that has some advantages over the above-described projector. Among these advantages is an improved dark field, which leads to higher contrast. One reason for such contrast improvement is improved discrimination between the light which is scattered by the NCAP device and the light which is transmitted by that device (specular light); the scattered light is collected and used in the output image, but the transmitted light (specular light) is blocked by a mask or stop in the light path and, therefore, does not reduce contrast.

SUMMARY

The present invention embodies one or more improvements to a liquid crystal projector which uses an optics arrangement in which scattered light is projected and transmitted light (specular light) is blocked, sometimes referred to as Schlieren optics.

Briefly, an NCAP projector in accordance with an aspect of the present invention uses optics in which scattered light is projected and specular light is blocked; and a liquid crystal device for selectively transmitting or scattering light through a relatively controlled angle. According to an aspect of the invention, the control of the scattering angle may be by using relatively low birefringence liquid crystal material in an NCAP device and/or by relatively accurately controlling the size of volumes of liquid crystal in the liquid crystal device. A number of advantages may inure to such a projector, such as, for example, an improved dark field, which leads to higher contrast, good light collection efficiency, tolerance of high intensity light sources, which leads to high brightness, and the ability to use very thin NCAP devices, which permits low voltage drive requirements.

According to an aspect of the invention, the simple center hole aperture of prior projectors which project light transmitted by the liquid crystal device is replaced by a ring aperture with a stop in the center. The stop in the center of the ring aperture may be the same size as the original simple hole aperture (or may be some other size). The specular light is blocked by the stop and the scattered light passes through the ring to be captured by the projection lens. The contrast in this type of projector may be increased relative to projectors with center hole apertures by minimizing the brightness of its dark state.

In accordance with an aspect, brightness of the dark state may be reduced or minimized by reducing or minimizing the residual haze of the full on state (transmissive mode) of the NCAP device. This can usually be done by collimating the light incident on the liquid crystal device so that the light would have normal incidence and, therefore, be well collimated as it passes through the NCAP device.

According to an aspect of the invention, a projection system includes a source of collimated (parallel) light, a liquid crystal device for selectively transmitting light or scattering light through a relatively controlled angle, and an aperture arrangement for transmitting scattered light while blocking specularly transmitted light.

According to another aspect, a projector includes a source of collimated light, a liquid crystal means for selectively transmitting light or scattering light through a relatively controlled angle, the liquid crystal means includes relatively low birefringence liquid crystal in a containment medium, and the liquid crystal having an ordinary index of refraction substantially matched to the index of refraction of the containment medium, focusing means for focusing the collimated light substantially to a point, a stop for blocking light directed to that point, and an opening for transmitting scattered light to form an image beyond that point.

According to another aspect, a method of controlling the angle of scattering of output light in a liquid crystal device includes controlling, limiting or selecting the birefringence of the liquid crystal material which cooperates with another medium and selectively scatters light or transmits light, the controlling, limiting or selecting comprising placing in physical relation with the medium liquid crystal material that has a birefringence of about 0.16 or less.

According to another aspect, a projection system in which an image is formed from nonspecular light includes a collimated light input, a liquid crystal device including liquid crystal material for selectively specularly transmitting light or non-specularly scattering light, projection optics for receiving non-specularly scattered light for projection, means to block the specularly transmitted light from projection by the projection optics, and wherein the angle of non-specular scattering is controlled by limiting the liquid crystal material to a birefringence that is about 0.16 or less.

According to another aspect, a projection system in which an image is formed from nonspecular light includes a light input, a liquid crystal device including low birefringence liquid crystal material in volumes in a containment medium for selectively specularly transmitting light or non-specularly scattering light, projection optics for receiving non-specularly scattered light for projection, means to block the specularly transmitted light from projection by the projection optics, and wherein the angular distribution of non-specular scattering is determined or related to the birefringence of the liquid crystal material and the thickness of the scattering material and/or number of scattering sites (volumes) in the light path.

According to another aspect, a projection method includes selectively scattering light over a relatively controlled angle or specularly transmitting light, blocking the specularly transmitted light, and directing the scattered light to provide an output image.

According to another aspect, a method of getting collimated light into a liquid crystal device that is operable selectively to scatter light or to transmit light without substantial scattering includes directing light from a light source to a beam splitter, reflecting light from the beam splitter to a collimating lens, directing the collimated light into the incident side of a liquid crystal device.

According to another aspect, a method of projecting a relatively high contrast image includes directing collimated light through a liquid crystal device that provides selectively transmitting of light or controlled scattering of light, using Schlieren optical system discriminating between transmitted light and scattered light, and projecting the scattered light to form an optical output.

The various patents mentioned herein are hereby incorporated in their entireties by reference thereto.

The invention, then, comprises the features described herein the description and the annexed drawings set forth in detail certain illustrative embodiments of the invention. These embodiments are indicative, however, of but a few of the various ways in which the principles of the invention may be employed.

Although the invention is shown and described with respect to certain embodiments, it is evident that equivalents and modifications will occur to others skilled in the art upon the reading and understanding of the specification. The present invention includes all such equivalents and modifications.

BRIEF DESCRIPTION OF THE DRAWINGS

In the annexed drawings:

FIG. 2A is a schematic illustration of an alternate embodiment of liquid crystal projector in accordance with the invention using a reflective scattering arrangement;

FIGS. 3B and 4 are graphical representations of the light scatter distribution for several film thicknesses NCAP device, the data in the graphs of both figures being the same, but the scale of FIG. 4 being expanded relative to the scale of FIG. 3;

DESCRIPTION

Figure 1:
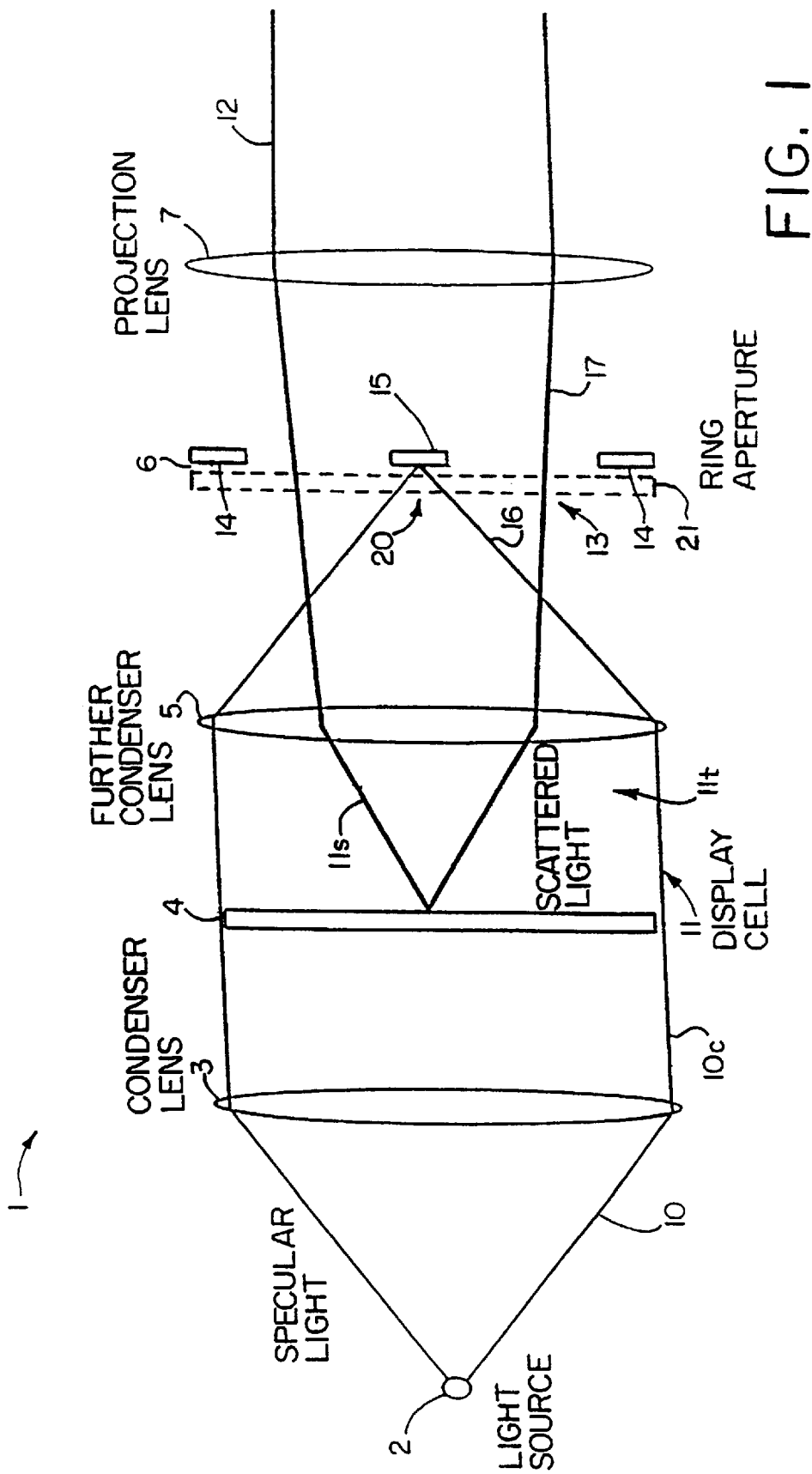
FIG. 1 is a schematic illustration of an embodiment of liquid crystal projector in accordance with invention.

Referring in detail to the drawings, wherein like reference numerals designate like parts in the several figures, and initially to FIG. 1, a projector in accordance with the present invention is generally indicated at 1. The projector 1 includes a light source 2, a condenser 3, a liquid crystal device 4, a further condenser 5, a ring aperture 6, and projection optics 7. Light 10 from the light source 2 is modulated by the liquid crystal device 4, and the modulated light 11 is discriminated by the aperture 6 to separate specular light, which is blocked, from scattered light which is projected by the projection optics 7 as a light output 12. The light output 12 may be directed to a screen or other device where it may be viewed or otherwise utilized.

The light source 2 may be an incandescent lamp, an arc lamp, or some other source of light. The light source 2 and condenser 3 cooperate to provide collimated light 10c, which is incident on the liquid crystal device 4. The light source 2 and condenser 3 are one example of a light source or supply to provide the collimated light 10c; it will be appreciated that other means may be used to provide such collimated light, such as, for example, various types of light emitting devices, lamps, lenses, reflectors, baffle systems, remote sources of light lasers, and so forth. In the exemplary embodiment illustrated in FIG. 1, the condenser 3 is a lens and the light source is positioned relative to the lens such that the light output therefore is collimated or is substantially collimated.

The liquid crystal device 4 transmits the light which is incident thereon or scatters the light that is incident thereon. The transmitted light (specular light) is represented at 11t and the scattered light is represented at 11s. Depending on the operative condition of the liquid crystal device 4 or respective portions thereof incident light 10c will be transmitted 11 or scattered 110. The light 11 from the liquid crystal device 4 is directed via the further condenser 5 to the aperture 6.

In the illustrated embodiment of projector 1 the aperture 6 is a ring aperture in which a generally annular opening 13 is formed in a mask 14. At the center of the annular opening 13 is a stop 15. The further condenser 5 and the aperture 6 cooperate such that the further condenser 5 focuses the transmitted light 11t at or near the stop 15, whereby the stop is able to block further transmitting of such light beyond the stop and aperture 6. The further condenser 5 and aperture 6 also are cooperative such that the scattered light 11s is directed by the further condenser through the opening 13 in the aperture 6 as light 17. The light 17 is projected by the projection lens 7 as the light output 12 of the projector 1. The light output 12 may be directed to a screen on which an image for covering is formed or may be otherwise utilized.

Light from the light source 2 may be collimated or at least such that if it is not scattered it will be blocked by the stop 15 or by some other means from transmission. In an example the light source is a point source and an image thereof is focused by the illustrated lenses or lens systems on the mask 15 thereby to block transmission of unscattered light.

The liquid crystal device 4 is described hereinafter as an NCAP liquid crystal device, several examples of which are disclosed in the above U.S. patents, and is known, such devices sometimes are referred to as composites, PDLC, LCPC, and possibly by other names or acronyms. However, other liquid crystal devices of the type which has operative modes to scatter light and to transmit light may be used. For brevity in this description, though, reference to NCAP device collectively refers to all such liquid crystal devices.

As is described in further detail below, relative control of the angle over which light is scattered by the liquid crystal device may be achieved by using relatively low birefringence liquid crystal material in the NCAP device and controlling the thickness of the liquid crystal device. In an exemplary NCAP device volumes of liquid crystal material and another medium cooperate to cause light scattering due to index of refraction differences. In such an exemplary device the liquid crystal material is birefringent; the extraordinary index of refraction is different from the index of refraction of the medium, and the alignment, organization, etc. of the liquid crystal is influenced by the medium, whereby incident light is scattered. However, in such exemplary device the ordinary index of refraction is matched or substantially matched to the index of refraction so that when alignment of the liquid crystal is appropriate, e.g., in response to a prescribed input, scattering decreases. Scattering may occur due to the mismatch between the index of refraction of the medium and the extraordinary index of refraction of the liquid crystal material; and a decrease in scattering may occur due to the closer matching of the ordinary index of refraction to the index of refraction of the medium compared to the larger difference between the extraordinary index and the index of the medium.

In an embodiment of the invention the birefringence of the liquid crystal is about 0.16 or less. More preferably is 0.12 or less. Even more preferably it is about 0.08 or less. Still more preferably it is between about 0.04 and about 0.08.

In an embodiment of the invention the liquid crystal volumes are about 5 microns or less in size or diameter. The size of the volumes may be about 4 microns or less. The size also may be about 3 microns or less. These sizes are, of course, approximate. The volumes may be spherical or another shape. The volumes may or may not be interconnected; or some may and some may not be interconnected. The volumes may be discrete or not. The volumes may be volumetric areas or space in a matrix of the medium. The size of the volumes may affect the density of the scattering sites for a given thickness of liquid crystal device; the smaller the scattering sites or scattering centers, the more scattering that is obtained.

In an embodiment the liquid crystal material may be nematic, smectic, cholesteric, operationally nematic, operationally smectic, or operationally cholesteric, smectic A or other material operative in the context of the invention. In an embodiment the liquid crystal material is nematic liquid crystal which has positive dielectric anisotropy. Other liquid crystal materials also may be used.

The medium may be any of many different materials, as is known. Examples include polyvinyl alcohol, polymer, resin, epoxy, urethane, acrylate, gelatin and others.

In the projector 1 illustrated in FIG. 1 light 10 from a small light source 2 is collimated by the condenser lens 3. When the NCAP liquid crystal device 4, which may be considered, for example, a light modulator or a display type of device, is in its clear state, the light remains collimated as it passes to the further condenser lens 5. This further condenser lens 5 then refocuses the light back to a small spot 20. The stop 15 of the ring aperture 6 is located at this focal point and blocks any light transmission of such specular light 11t. Any light 11s scattered by the NCAP device 4, is directed by the further condenser lens 5 through the ring aperture 6 to the projection lens 7. The further condenser lens 5 and projection lens 7 combine to focus an image of the NCAP device 4 on a projection screen (not shown). The focal distance can be adjusted by changing the spacing between these two lenses.

It will be appreciated that although lenses are illustrated and described herein for various optical functions, other equivalent devices may be equivalently used; examples are one or more reflectors, combinations of lenses, of reflectors or of both lenses and reflectors, and so forth.

Another optical phenomenon that can degrade the performance of the dark state of the projector 1 is diffraction. When the NCAP device 4 is divided into pixels for display purposes, an isolated clear pixel can diffract a very small fraction of the light passing through it. The diffracted light will no longer be parallel to the original beam and the further condenser lens 5 will not focus it onto the stop 15. Instead it would pass through the ring aperture 6, and would be collected by the projection lens 7 for projection, thus possibly reducing contrast or otherwise degrading the projected image. This problem can be ameliorated by placing an appropriate phase plate 21 at the ring aperture 6, as is schematically shown as an embodiment possibility for the projector 1 of FIG. 1. This phase plate 21 acts as a spatial filter and can eliminate or reduce the effect of such diffraction.

An alternate embodiment of projector 1' is illustrated in FIG. 2A. In FIG. 2A primed reference numerals designate parts that are similar or the same in form and function as corresponding parts designated by unprimed reference numerals in FIG. 1. The projector 1' is used in a reflective mode, as illustrated in FIG. 2A.

As is seen in FIG. 2A, a plain mirror 30 is placed on the back side 4b of the NCAP device 4', which is now illuminated from the front side 4f. Only a single condenser lens 3' is required in the projector 1'. The single condenser lens 3' performs two separate functions. It collimates the light from the source 3' and also refocuses the collimated light reflected from the display device 31, for example, including the NCAP device 4' and the mirror 30, onto the stop 15' of ring aperture 6'. A beam splitter 32 allows the source and reflected beams to overlap. An advantage of the reflection mode is that it permits the thickness of the NCAP device 4', e.g., the one or more layer(s) of liquid crystal material or volumes of liquid crystal thereof, to be of a reduced thickness, e.g., compared to the thickness of the NCAP device 4 of the projector 1 of the FIG. 1 embodiment, and such reduction in thickness can result in a reduction in the required drive voltage for the NCAP device. This is because the light now makes two passes through the liquid crystal device 4'.

Figure 2B:
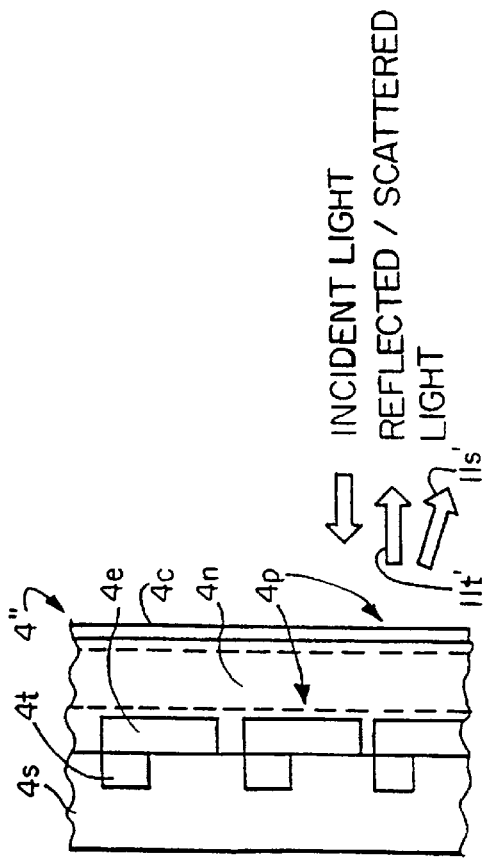
FIG. 2B is a schematic illustration of a solid state light scattering device for use, for example, in a projector similar to that of FIG. 2A.

Briefly referring to FIG. 2B a solid state light scattering device 4" is illustrated schematically. The device 4" includes a substrate 4s, such as silicon material on or in which conductors, electrodes 4e, transistors 4t, etc., are located. NCAP material or other scattering material 4n is on the substrate and one or more counter electrodes 4c are provided to cooperate with respective electrodes 43 selectively to apply electric field to portions of the NCAP material. Respective electrodes 4e, counter electrode(s) 4c and NCAP material therebetween may be considered respective pixels (picture elements or pels) which may be operated to transmit light or to scatter light, depending on whether or not suitable electric field is applied thereto, thereby to create an image for projection. The electrodes 4e may be optically reflective or other means may be provided to reflect light incident thereon back through the NCAP material for specular transmission or for scattering. Thus, it will be appreciated that the device 4" in effect may be a solid state display, e.g., a chip having display components, an example of which may be a TFT (thin film transistor) or active matrix array type device with the NCAP material operative to create the desired image for projection. Other types of solid state or other devices also may be used for the display to create an image for projection.

A limitation of scattering system, is that any light that is scattered into too large of an angle will not hit the entrance pupil of the projection lens, and is lost. Therefore it is desirable to have an NCAP device with a narrow scatter distribution. This will allow a projection lens of reasonable f# to capture more of the scattered light energy.

The pattern of light scatter in NCAP devices is controlled by several factors and differs in several ways from common passive scattering materials. The primary factors is liquid crystal birefringence. Light photons passing through an NCAP cell (sometimes the NCAP device may be referred to herein as a cell or even as a layer) are segregated into three distinct populations. One segment of the photon population sees no scattering at all. It passes through the cell in a completely specular fashion (transmitted light or specular light). The photons in the second group participate in precisely one scattering event each. The photons in the third group engage in multiple scattering events. The relative sizes of these groups are determined principally by the thickness of the NCAP layer. The angular distribution of the photons in group two is controlled by the liquid crystal birefringence.

Figure 3A:
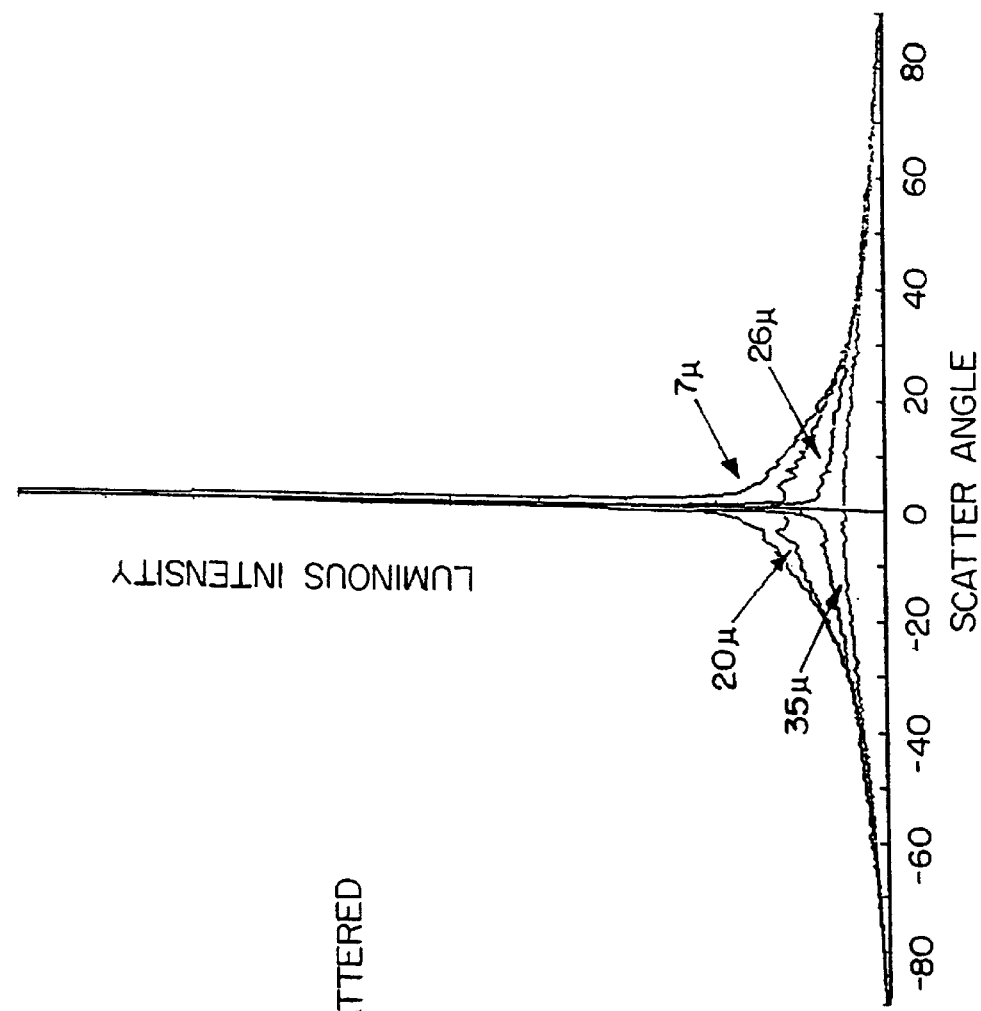
FIG. 3A is a graph representing the relation between collection f number (f#) and liquid crystal birefringence for 70% and for 85% collection of scattered light for projection.

In FIG. 3A is an exemplary graph which shows the relationship between the collection f number (f#) and the birefringence of the liquid crystal in an NCAP layer. Two curves are shown in FIG. 3A, one is for a projector for which 70% of the scattered light is collected for projection and the other is for which 85% of the scattered light is collected for projection. As an example, a collection f# having a lower limit of about f1 would collect about 85% of scattered light for NCAP material having liquid crystal of 0.12 birefringence. A satisfactory quality f1 lens is available for such a collection f# and is of reasonable price; the lower the f# is, usually the more expensive is the lens. As another example, an f2 collection f# and associated lens would collect 70% of scattered light from an NCAP device which has a birefringence of about 0.8.

Although examples of collection efficiency of 70% and 85% are shown, it will be appreciated that such collection efficiencies may be 90% or more and, if desired, may be less than the indicated 70%.

For a very thin NCAP cell with no voltage applied, the photon population distribution is dominated by the unscattered fraction. Most of the remaining photons are involved in single scatter events. Very few photons are multiple scattered. As the thickness of the NCAP layer is increased photons are shifted from the unscattered group to the single scatter group. For a substantial portion of the thickness range, there is little transfer to the multiple scatter group. As a result the shape of the angular distribution of photons changes little. The relative amplitudes of the scattered and unscattered populations change, but the width of the distribution for each does not. As the cell thickness increases beyond this range, a significant amount of multiple scatter begins to occur. Since the multiple scatter distribution is wider than the single scatter distribution, the composite distribution widens as the NCAP thickness grows. The single and multiple scatter distributions overlap and are not easily distinguishable. In the limit, all photons are multiple scattered, leading to a Lambertian distribution. An example of this trend is illustrated in FIGS. 3B and 4 using a series of NCAP cells of varying thickness, made using the same liquid crystal (E49). These graphs are plots of luminous intensity vs. scatter angle (as measured from the normal). A Lambertian diffuser would produce a cosine curve on the type of plot. FIGS. 3B and 4 present the same data but on different scales. The feature to be noted in FIG. 3B is the size if the spike centered at 0°. This represents the amount of unscattered light. The increased scale of FIG. 4 makes it easier to see the shape of the scattered portion of the distribution. When the curves for the 7 and 20 micron thick NCAP film samples are compared, a substantial difference in the amplitudes of the unscattered specular peaks can be seen. Yet, the shape of the angular scatter is almost the same, with only a change of amplitude, corresponding to the transfer from the specular population. This indicates that most of the scattered photons have undergone only one scatter event. The curve for the 26 micron thick sample begins to show a change of character. The specular peak is almost gone and the width of the scatter has widened, indicating a significant increase in multiple scattering. The 35 micron sample shows a complete absence of specular photons and the width of the scatter distribution indicates that multiple scatter is now dominant.

As the voltage is applied or removed the angular distribution of scattered light as represented by a curve, such as those shown in several drawings hereof, usually does not change significantly. Rather, the curve (intensity) is depressed as voltage increases and expands (increases in intensity) as the voltage is decreased.

Figure 5:
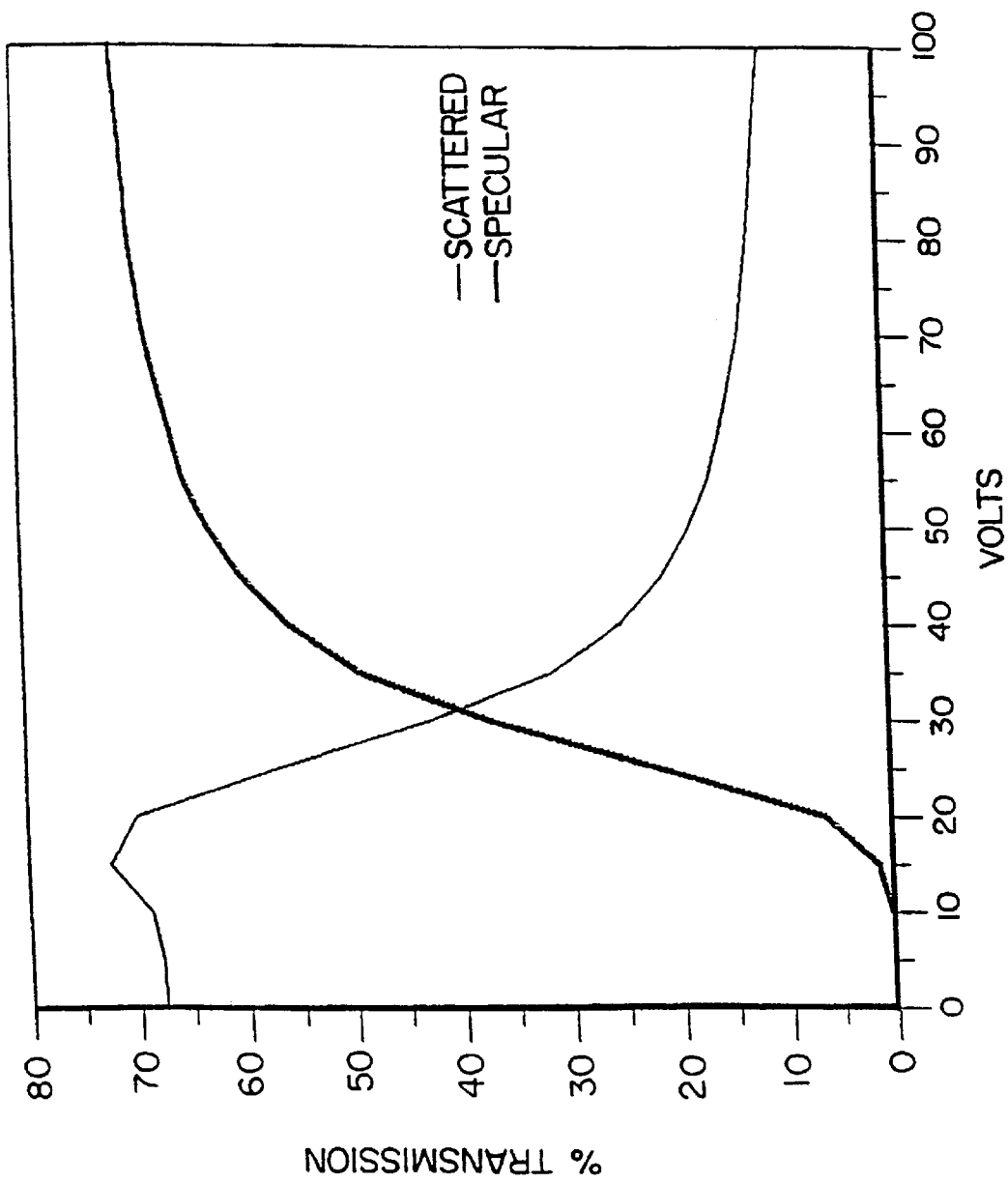
FIG. 5 is a graph illustrating the transfer of light from the scatter to the specular for a 20 micron thick NCAP device.

The voltage response mimics the thickness response. The voltage is the voltage of electric field applied across the liquid crystal example as the prescribed input. There is a small voltage threshold, below which no change in the scatter distribution occurs. As voltage is increase beyond the threshold, photons are transferred from the scatter groups to the specular group. The transfer of light from the scatter to the specular is graphed for a 20 micron cell in FIG. 5. As can be seen, there is a knee at about 3 times the threshold voltage. Above that level the transfer process goes asymptotically to a limit. As with thickness, changes in the applied voltage do not change the distribution width of any of the 3 photon populations. Only the relative amplitudes are changed.

The dependence of the width of the scatter distribution on particle size and liquid crystal birefringence can be understood by thinking of each scatter event as refraction by a spherical lens. The focal length of a spherical lens is proportional to its radius and inversely proportional to its index of refraction. The angle through which the lens refracts any given ray of light increases with decreasing focal length and with increasing distance between the incident point and the center line of the lens. The liquid crystal material is birefringent. Its ordinary index of refraction is matched to the index of refraction of the binder, medium, or containment medium. The extraordinary index of refraction is somewhat higher. The "index of refraction" may be referred to as "index" below. When the NCAP film is in the low voltage, high scatter, state, the director of the liquid crystal droplet lies in or near the plain of the film. As a result, light rays entering the film at normal incidence will see the extraordinary index as the index of the particle. For rays off normal, the index will be slightly lower. While the liquid crystal particles in NCAP films are oblate spheroids, rather than true spheres, the general trend can be illustrated by looking at refraction by a sphere with index of refraction equal the liquid crystal extraordinary index imbedded in a media with an index equal to the ordinary index.

Figure 6:
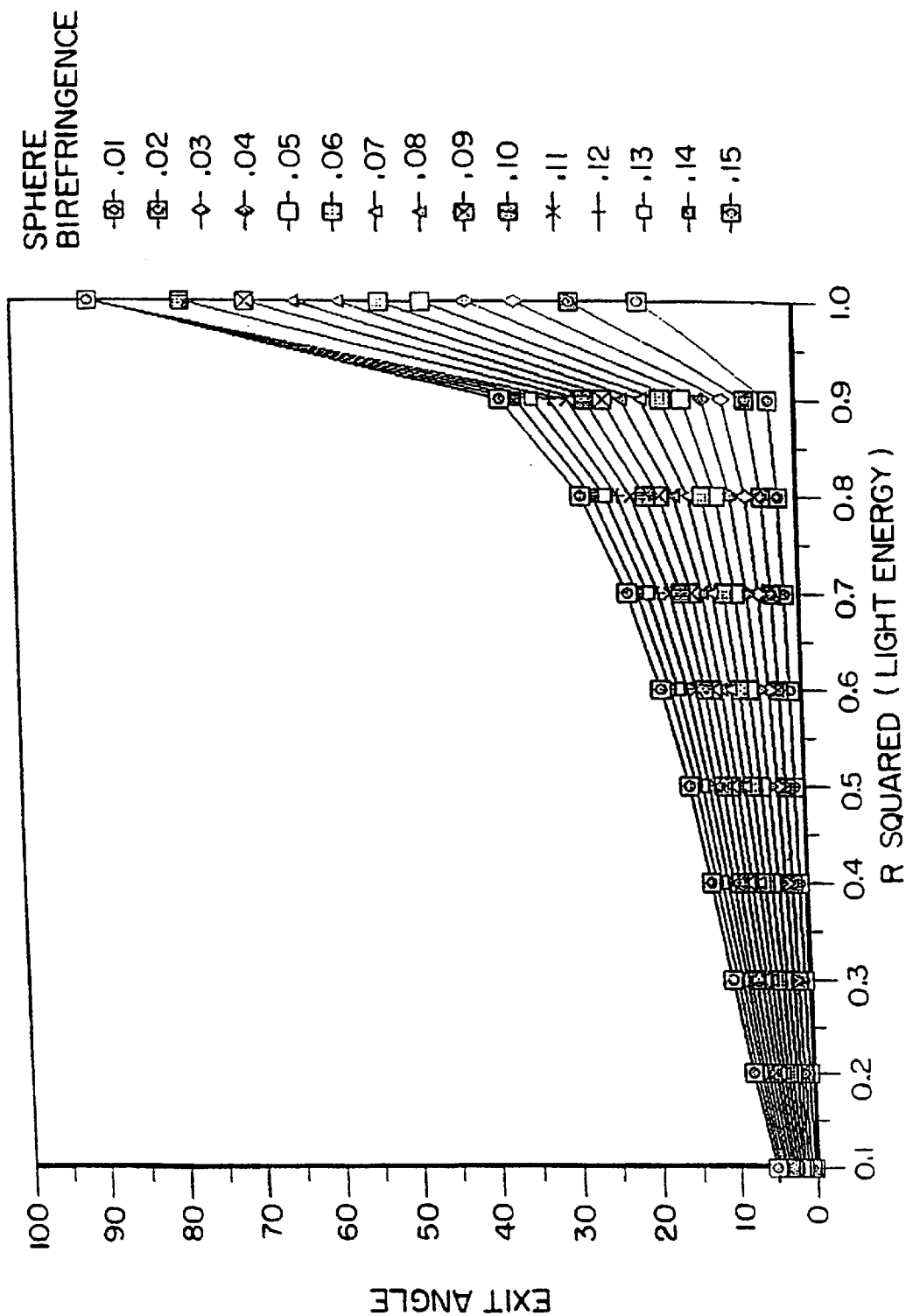
FIG. 6 is a graph showing the impact of birefringence on refraction angle for a spherical device, such as a liquid crystal material contained in a generally spherical containment medium, and in a sense is a plot of the refraction cone angle vs. the light energy contained within that cone for different liquid crystal birefringence.

FIG. 6 shows the impact birefringent on refraction angle. In this plot R is distance of the incident point on the sphere from the center line. The light energy refracted inside a given exit angle is proportional to the projected area of a circle of radius R on the input of the sphere. That area is in turn proportional to $R^2$. Effectively this is a plot of the refraction cone angle vs. the light energy contained within that cone for different liquid crystal birefringence. As can be seen, higher the birefringence, produces a wider the distribution of light energy.

Figure 7:
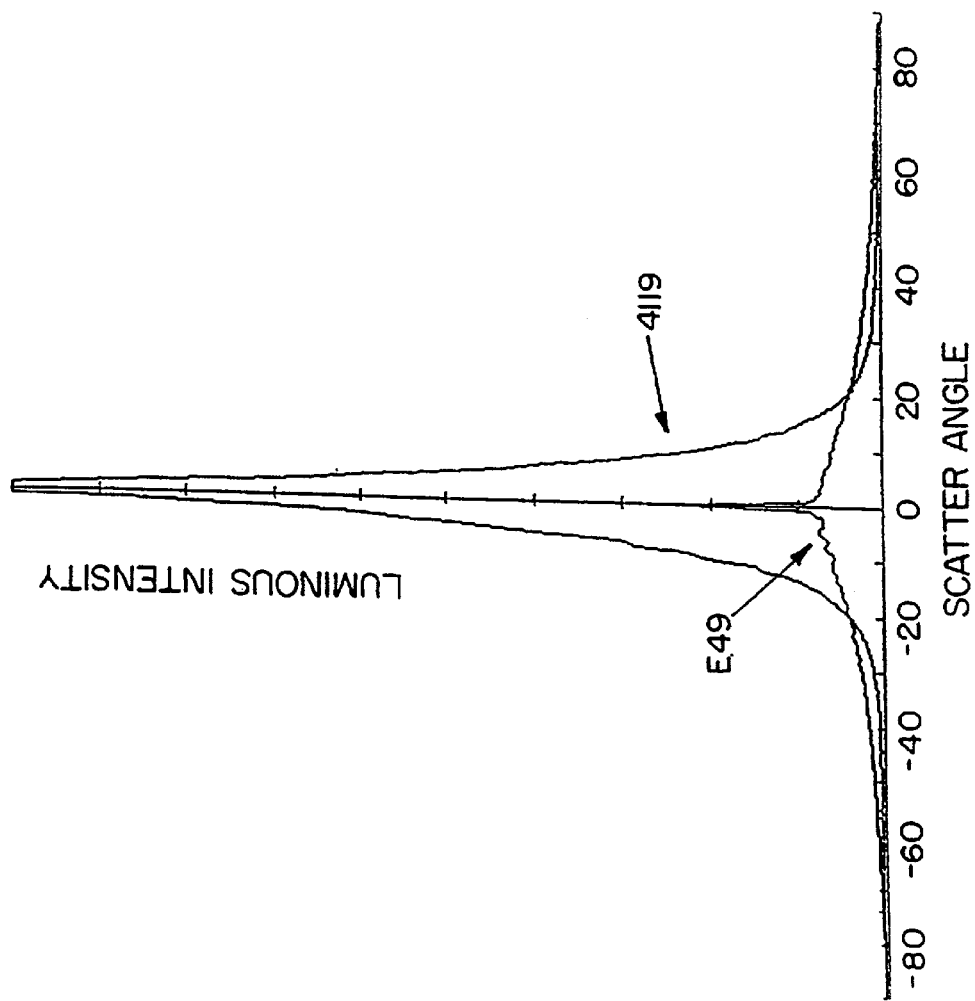
FIG. 7 is a graph illustrating the impact of liquid crystal birefringence on the width of NCAP scatter distributions for two different NCAP films, one with relatively high and the other with relatively low birefringence.

FIG. 7 illustrates the impact of liquid crystal birefringence on the width of NCAP scatter distributions. This shows the scatter for two NCAP films, one with high and the other with low birefringence. The birefringence of E49 and 4119 are 0.25 and 0.06 respectively. Each film is chosen with thickness such that the distribution is dominated by the single scatter mode, with a small amount of specular leak through. Clearly the lower birefringence material has a much narrower scatter distribution. To determine the correlation of scatter width on the efficiency of the projector, one may convert the intensity plot to an energy density plot. This is done by multiplying the intensity at a given angle by the solid angle of a differential annular ring at that angle. This transformation is performed in FIG. 8. The light collection efficiency for a projector lens of a given f# depends on the amount of energy that falls within its entrance pupil. Most of the energy from the low birefringence NCAP is captured by an f 1.4 lens, such as a 50 mm f1.4 Nikor lens made by Nikon, as an example. For the high birefringence NCAP most of the energy is not. Notice that there is very little energy contributed by the very center of the distribution. This means the stop 15 in the center of the ring aperture will block very little of the scattered light.

Scattering angle, e.g., angular distribution of scattered light, is independent of the applied voltage; the scattering angle primarily is a function of the birefringence. The voltage determines how much light scatters at a given angle within the scattering angle range. This is for a thin film of the type disclosed herein, for example. If a thick film, there are more multiple scatters and the foregoing may not be as consistently true.

Figure 8:
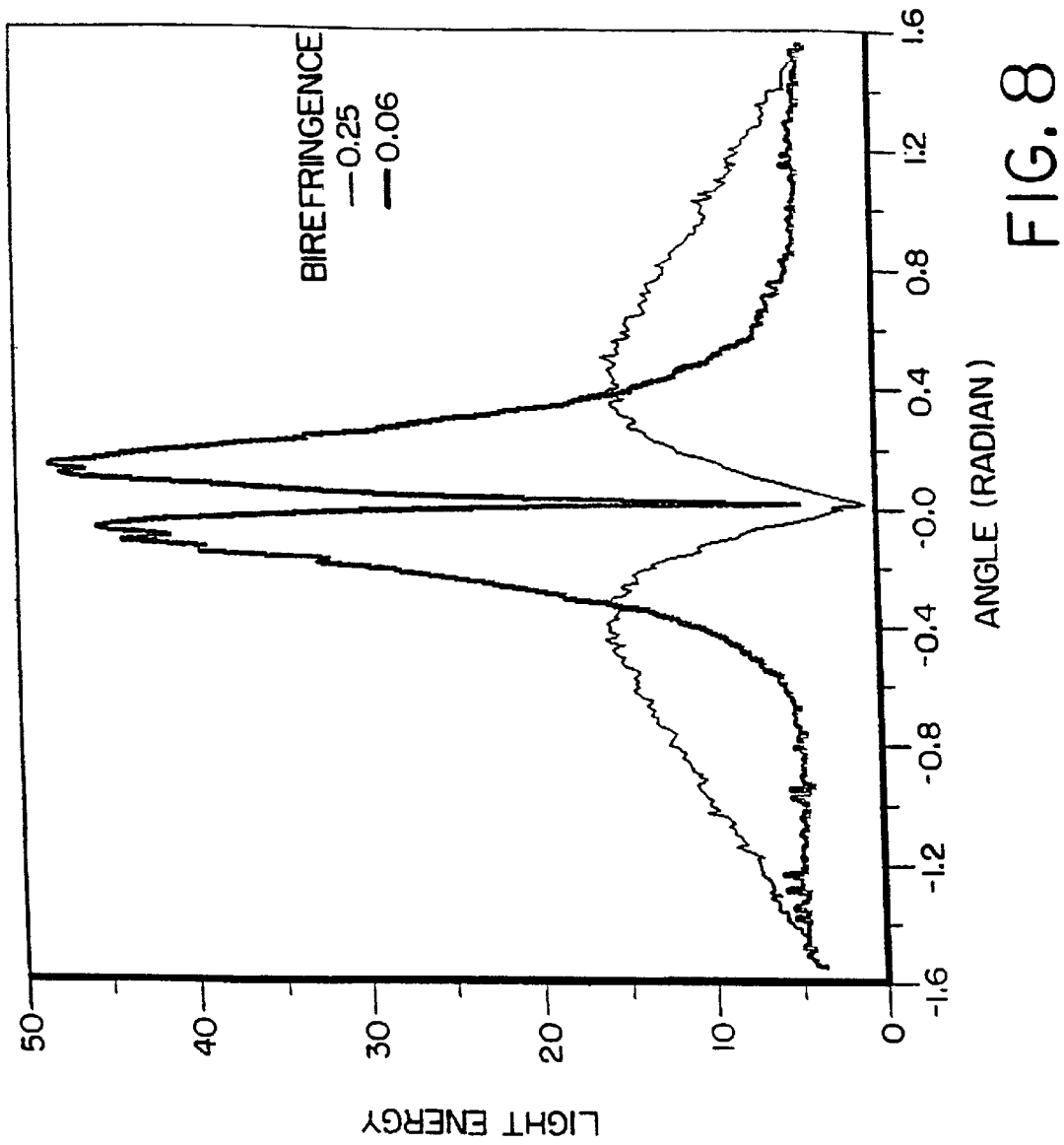
FIG. 8 is a graph illustrating scatter energy distribution for two different NCAP films, respectively, having relatively high birefringence and relatively low birefringence.

FIG. 8 shows for a high birefringence material the scattering goes out farther over a wide distribution; but for a low birefringence material the angular distribution is narrower. The distribution remains the same as the voltage varies, but the entire curve drops down to lower light energy that is scattered (see left axis). In FIG. 8 the light energy that is scattered reduces as voltage drops; but the distribution of the scattered light energy remains the same.

A lower birefringence liquid crystal material usually results in lower scattering angle; but there still is scattering. In such case, the lens can collect more light because it has scattered over a smaller angle.

An advantage of the low birefringence NCAP Schlieren projector of the type described, is that it can provide high contrast images with extremely thin NCAP layers. In turn this allows low voltage drive circuits to be used. Also, a high intensity light source can be used, because there is negligible absorption in NCAP material. The narrow scatter angle of the low birefringence NCAP leads to a high collection efficiency with a reasonable size projection lens. The bright source combined with the efficient collection yield a bright projected image.

A further advantage to the present invention as disclosed herein is the improved light throughput efficiency for bright areas of the projected image. Since polarized light is not required, there is no reduction in the input light intensity when unpolarized light is polarized, e.g., by transmission through a polarizer which ordinarily would be expected to reduce light transmission by 50% or more. Additionally, using relatively low birefringence liquid crystal material and an exit aperture coordinated with that birefringence, as was mentioned above a high collection efficiency for the scattered light is obtained and this along with the avoidance of light reduction since polarized light is not required, collection efficiency for the scattered light can be 50% or even greater. Several examples of collection efficiency of 70%, 85% and even 90% are described elsewhere herein.

An example of light source 2 may be, for example, a metal halide light source. To facilitate collimation of light directed to the liquid crystal device the light source 3 may be located at the focal point of the condenser 3 lens; the accuracy of such positioning, though, may vary with the extent of collimation desired. For example, if haze is not of concern and it is not necessary to have the incident light normal to the liquid crystal device, then other arrangements of the light source and condenser may be employed. Similarly, the function of the further condenser 5 is to direct light that was not scattered by the liquid crystal device 4 to the stop 15. The precise positioning of the further condenser 5 and the stop 15 may be varied, provided such function is obtained; however, in an embodiment of the invention, the further condenser receives the specular or transmitted light as collimated or substantially collimated, and the stop 15 is positioned at the focal point of the further condenser so that such focusing of such light thereat is obtained.

The projection optics 7 may be a single projection lens or a combination of lenses, reflectors or other elements that project the light output 12 for the desired purpose, such as to provide an image on a screen or some other purpose.

The distance between the NCAP device 4 and the condenser 3 of projector 1 is not critical. The distance between the NCAP device 4 and the condenser 3' of projector 1' preferably is such that the image of the NCAP device can be in effect focused at the screen onto which the output light 12 is directed.

Desirably the liquid crystal material used gives the optimum output and contrast with respect to an output, e.g., output optics, of a particular f number.

Also, desirably the layer of scattering material is as thin as is reasonably possible to avoid losing scattered light due to scattering at such a wide angle that it would not be passed through the opening 13. Therefore, preferably the angular distribution of the scattered light would have peaks near the center, for example, as is illustrated in FIG. 8. Although there may be some light leakage, that leakage does not significantly affect the scattered output light because the amount of scattered light which passes through the opening is relatively large (intense) and creates a relatively bright projected area of the projected image.

Moreover, although the aperture 6 may be a ring aperture having a generally annular opening 13 in a mask or plate 14 with a central stop 15, it may be possible to eliminate the plate 14 itself. In such case, the central stop 15 blocks specular light; and the collected scattered light for projection by the projection optics 7 may be determined by the size and/or f number of the projection optics itself. Therefore, the aperture may be defined by the stop and a light transmitting area adjacent the stop, and the radial extent or remote limit or distance of the light transmitting area of the aperture is limited by the f number of the projection optics. Also, the aperture may be absent an external defining element, and the entrance pupil of the projection optics limits the amount of light that is collected from the aperture.

The relatively thin NCAP device useful in the invention permits the use of a relatively low drive voltage. Due to the cooperation of the liquid crystal device and the ring aperture, the output light 12 provides a bright image; there is relatively little bleed through that would degrade contrast, e.g., compared to the leakage of prior center aperture projectors mentioned above. Also, since the liquid crystal device can be thin, the amount of energy dissipated therein is rather small, and, accordingly, bright light sources can be used without causing a burn out of the liquid crystal device due to excess heat or energy dissipation in the liquid crystal device; this in combination with the ring aperture arrangement allows a substantial amount of light to be put through the projector to provide a bright output.

The central stop 15 may be supported in the annular opening 13 by various means. One example is a spider type of support. Another example is to use a glass or other transparent material in the opening area and of the plate 14 and to place an optically non-transmissive material at the center area of such material to serve as the stop 15. Also, if desired, a light pipe, reflector, or some other device may be placed in the area of the stop 15 to conduct light directed thereto away from the light path leading to the projection optics.

Further, although in the projectors hereof a separate projection optics 7 is disclosed, it will be appreciated that the lens of the further condenser 5 may be coordinated with the other components of the projector to provide the projection function without the need for separate projection optics or with the modification of the projection optics.

The invention also embodies drive circuitry for driving the liquid crystal device 4. Such circuitry may comprise one or more conductors, integrated circuit devices, thin film transistors or other devices, other solid state devices, other electrical devices or components, video circuitry, television circuitry, computer, electrodes, and so forth. Such circuitry may be used to drive the liquid crystal device and to generate the signals to drive the device, e.g., to develop an image for projection.

Also, the liquid crystal device may be a plurality of such devices operated simultaneously or sequentially or both to provide monochrome, color or multicolor output light and images.

What is claimed is:

1. An optical system, comprising
a source of light,
an output system having a collection angle for receiving light and passing such received light as an output,
a liquid crystal device for selectively scattering light through a controlled angle such that a major portion of the scattered light may be collected by said output system, or transmitting light,
wherein the liquid crystal device comprises birefringent liquid crystal material in a medium, the device being operable to cause scattering of light in the absence of a prescribed input and reduces scattering in response to the prescribed input; wherein the medium includes surfaces interactive with the liquid crystal material to cause scattering of light due to a difference between the extraordinary index of refraction of the liquid crystal material and the index of refraction of the material of the surfaces,
said output system including an aperture for transmitting such scattered light and blocking unscattered light, and
the birefringence of said liquid crystal material is about 0.16 or less and is selected to coordinate a prescribed relationship between said controlled angle and said collection angle.

2. The system of claim 1, wherein the output system and liquid crystal device are matched such that the coordination of said controlled angle and said collection is such that a major portion of collected light is equal or greater than 70% of the scattered light.

3. The system of claim 2, wherein the output system and liquid crystal device are matched such that the major portion of collected light is equal or greater than 90% of the scattered light.

4. The system of claim 1, wherein said aperture is matched to the light scattering distribution to obtain such collection, and the selective transmitting and blocking of light transmission for projection is at least substantially independent of optical polarization thereby to obtain efficiency of light throughput on the order of about 50% or greater for the bright areas of the projected image.

5. The system of claim 1, wherein said liquid crystal material and medium comprise plural volumes or volumetric areas of liquid crystal material in the medium, the medium having an index of refraction, the liquid crystal having an ordinary index of refraction that is matched to the index of refraction of the medium to reduce scattering in response to a prescribed input without substantial change in the controlled angle.

6. The system of claim 1, wherein the birefringence of the liquid crystal material is about 0.08 or less.

7. The system of claim 6, wherein the birefringence of the liquid crystal is between about 0.04 and about 0.08.

8. The system of claim 1, wherein the liquid crystal device is encapsulated liquid crystal.

9. The system of claim 1, wherein the medium is selected from the group consisting of polyvinyl alcohol, polymer, resin, epoxy, urethane, acrylate and gelatin.

10. The system of claim 1, wherein the liquid crystal material has positive dielectric an isotropy and is selected from the group consisting essentially of operationally hematic, smectic, smectic A, and cholesteric liquid crystal.

11. The system of claim 1, wherein said aperture comprises an annular or ring-like opening and has a central stop portion.

12. The system of claim 1, further comprising projection optics for projecting an image of the liquid crystal device, the image having contrasting relatively brighter and relatively darker portions including relatively brighter portions representative of areas of the liquid crystal device that are scattering light and relatively darker portions representative of areas of the liquid crystal device that are specularly transmitting light, and further comprising electrical means for selectively supplying a prescribed input to the liquid crystal device to form an image.

13. The system of claim 12, further comprising circuit means for supplying signals to said electrical means for developing the image.

14. The system of claim 1, wherein the liquid crystal material of the liquid crystal device is nonlight absorbing.

15. The system of claim 1, wherein the liquid crystal material is absent light absorbing dye.

16. The system of claim 1, wherein said liquid crystal device includes liquid crystal material having a birefringence between 0.04 and 0.16 and a collection f# chosen from a range of f1 and f4 optimized to maximize the collection of scattered light.

17. The system of claim 1, said output system comprises an exit aperture having an f#, and said f# and birefringence are related to cause the collected light to be greater or equal to about 70% of the scattered light, and said f# being about 1.5 and said birefringence being about 0.08.

18. The system of claim 1, said liquid crystal device comprising a light scattering device that has a relatively narrow angular distribution of scattered light from about plus and minus 20 degrees from normal incidence to about plus and minus 40 degrees from normal incidence.

19. A projector, comprising the optical system of claim 1, and wherein said liquid crystal device forms an image for projection by selectively transmitting light or scattering light through the relatively controlled angle, and said output system comprises a projection lens for projecting scattered light to form an image.

20. The system of claim 19, wherein said liquid crystal material has a birefringence of from about 0.12 to about 0.04 and the f# of the projection lens is between f1 and f3.

21. The system of claim 20, said projection lens comprising projection optics for projecting an image formed by the liquid crystal device and wherein the size of the aperture is coordinated with the birefringence of the liquid crystal material to optimize the brightness of the image, and wherein the amount of unscattered light that is blocked optimizes the contrast.

22. An optical system for producing a selective optical output, comprising, a liquid crystal device for selectively optically scattering light over a prescribed angular distribution that depends on the birefringence of the liquid crystal material in the liquid crystal device, wherein the liquid crystal material has a low birefringence between about 0.16 and 0.04, and wherein in response to a varying magnitude field input the angle over which light is scattered remains substantially the same while the amount of light scattering varies with respect to the magnitude of such field input a collection lens means for collecting a substantial portion of the light scattered over such angular distribution, means for blocking unscattered light, and means for applying a field input to the liquid crystal device to alter the intensity of scattered light without substantial change in the angular distribution.

* * * * *